Nov. 3, 1942.  E. J. TAUCH  2,300,849
SULPHURIC ACID MANUFACTURE AND APPARATUS THEREFOR
Filed March 9, 1940  2 Sheets-Sheet 1

Ernest J. Tauch
INVENTOR
BY Albert B. Griggs
ATTORNEY

Ernest J. Tauch
INVENTOR

BY Albert B. Griggs
ATTORNEY

Patented Nov. 3, 1942

2,300,849

UNITED STATES PATENT OFFICE 2,300,849

SULPHURIC ACID MANUFACTURE AND APPARATUS THEREFOR

Ernest J. Tauch, Cleveland Heights, Ohio, assignor to E. I. du Pont de Nemours & Company, Wilmington, Del., a corporation of Delaware Application March 9, 1940, Serial No. 323,104

4 Claims. (Cl. 210—150.5)

This invention relates to the filtration of sulphur which is to be used in the manufacture of sulphuric acid. The invention is particularly directed to an apparatus for the filtration of sulphur and is more particularly directed to apparatus and processes wherein the filter cake which collects during the filtration of sulphur is slurried with water and removed from the apparatus in a granular and readily handleable condition.

The filtration of sulphur has heretofore been none too successful, the processes and apparatus used being rather poorly adapted to the handling of the molten sulphur. Sulphur has heretofore been strained or decanted to remove large pieces or chunks of foreign material and it has also been proposed to filter sulphur through beds of carbon to adsorb impurities. Filtration to remove carbonaceous matter has also been suggested.

One of the principal problems in the filtration of sulphur is the handling of the filter cake which accumulates on filter elements. If the flow of sulphur is reversed to "back-wash" the filter elements a considerable amount of sulphur is contaminated with impurities. If the filter cake is removed from the filter elements by other means it is very difficult to handle since upon cooling the filter cake becomes hard and forms a mass which can be chiseled and scraped away from any vessel into which it is run with great difficulty.

It is an object of this invention to provide a simple and economical filter for molten sulphur. It is a further object of this invention to provide processes whereby filter cake on the elements of a sulphur filter may readily and easily be removed from the filter elements and from the filter. It is a still further object of this invention to provide a simple apparatus for carrying out such processes. Further objects will become apparent hereinafter.

The foregoing and other objects of my invention are effected by the use of an apparatus more particularly described hereinafter. In general, the processes of this invention involve filtering molten sulphur until a filter cake is built up on filter elements; holding the filter cake on the elements with steam or gas pressure while removing sulphur from the filter, passing a reverse flow of a fluid such as gas, steam, or water through the filter to remove the filter cake from the filter elements, admitting water to the filter if gas or steam was used for back-washing, and admixing the water with the filter cake to produce a granular slurry which may readily be removed from the filter. My invention will be better understood by reference to the accompanying drawings wherein:

Figure 1:
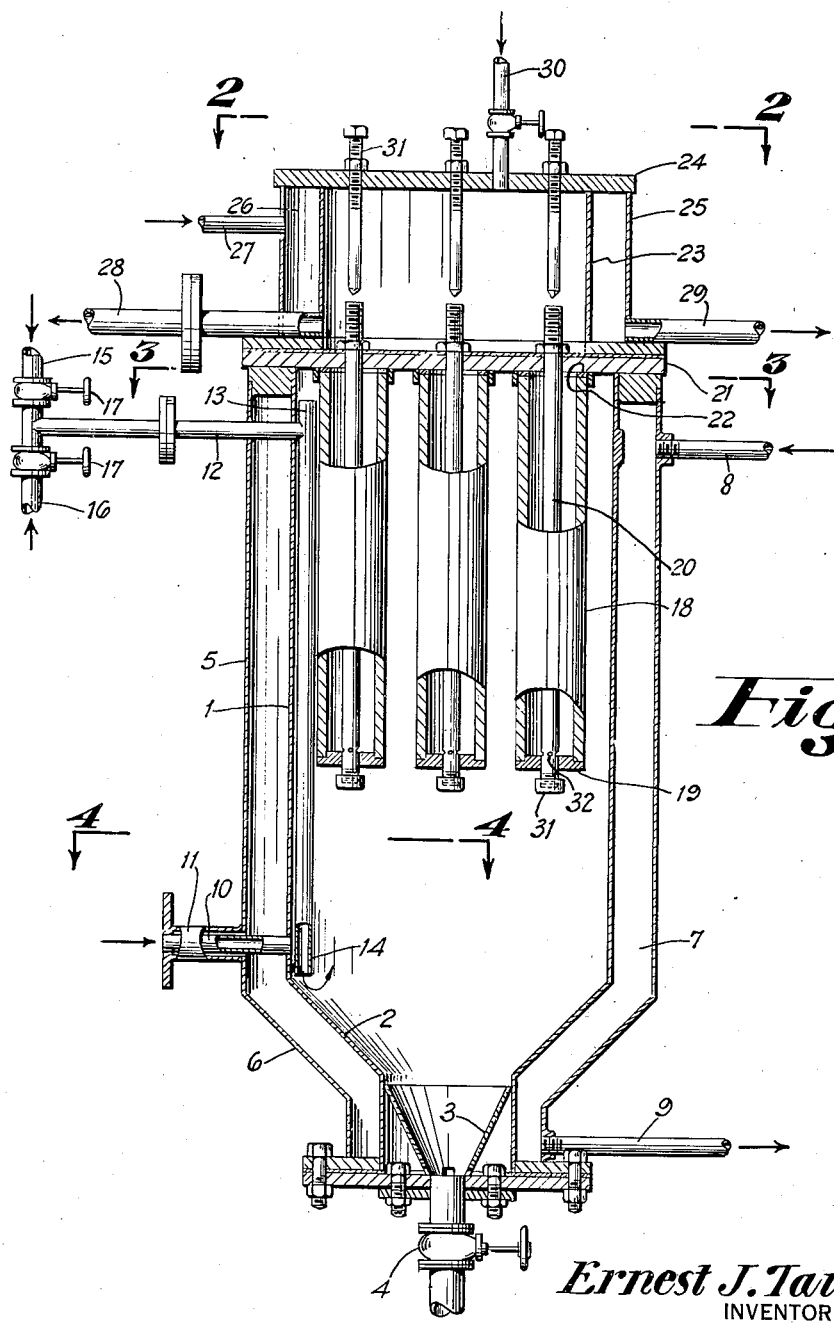
Figure 1 is a sectional elevation showing an apparatus of this invention.
Figure 2:
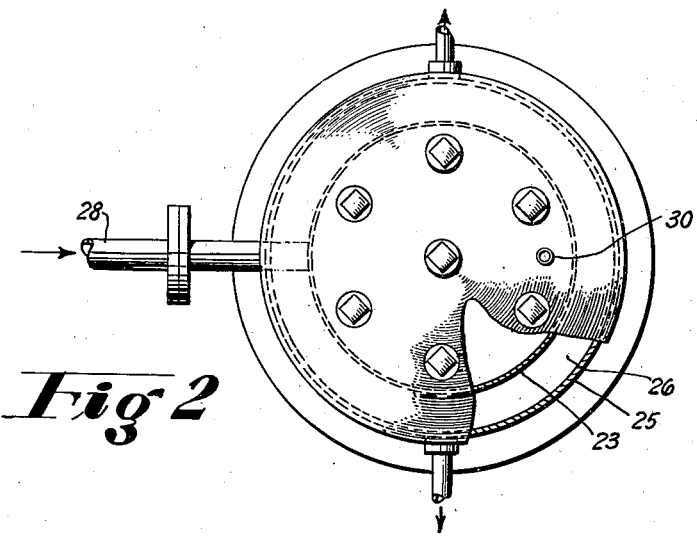
Figure 2 is a plan view of the apparatus of Figure 1.
Figure 3:
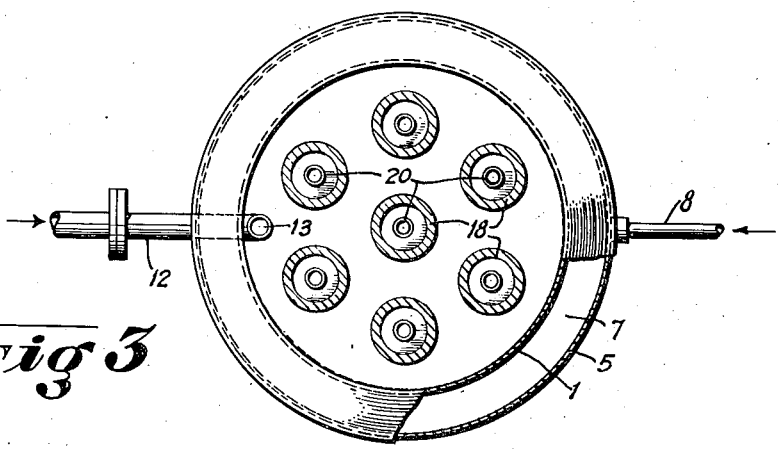
Figure 3 is a sectional view taken on the line 3—3 of Figure 1.
Figure 4:
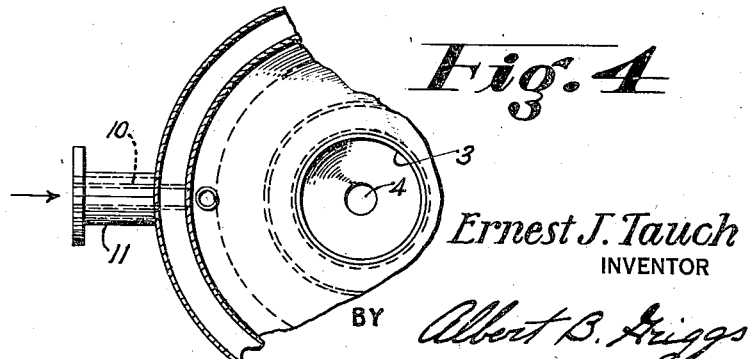
Figure 4 is a sectional view taken on the line 4—4 of Figure 1.

In the drawings it will be seen that a casing 1 is provided at its lower end with a cone-like casing extension 2. The cone-like member 2 discharges at its lower extremity into a cone-shaped outlet 3. Material discharged through the outlet 3 passes through a valve 4.

Surrounding the casing 1 is a steam jacket 5. At the lower portion of the steam jacket 5 there is provided a cone-like jacket extension 6. It will be seen that the jacket members 5 and 6 are spaced from the casing members 1 and 2 so as to provide an annular steam space 7. A steam inlet is provided in the jacket 5 at 8 and an outlet is provided at 9 for condensate.

The steam space is caused to extend around a sulphur inlet 10 by a concentric pipe 11. A T-shaped pipe 12 extends through the jacket 5 and the casing 1. The upper leg 13 of the pipe 12 is open at the top and the lower leg 14 is open at its lower extremity. A steam pipe 15 supplies steam or any other desired gas to the pipe 12 and the pipe 16 supplies water. The valves 17 permit admission of steam or water alternatively and permit shutting off the flow of both fluids.

Filter elements 18 are provided in the upper part of the apparatus. These filter elements may be Aloxite cylinders or they may alternatively be comprised of any other suitable filtering material such as carbon. The filter elements are closed at their lower ends with a plug which is held in place by means of a hollow tube 20 which runs the full length of the filter element through a header plate 21. The filter elements 18 are held against the lower side of the header plate 21 upon gaskets 22.

Above the header plate there is provided a cylindrical chamber wall 23 closed at its upper end with a circular cover 24. A concentric cylindrical member 25 is spaced from the cylindrical chamber wall 23 forming an annular steam space 26. Steam can be supplied to the space 26 by means of pipe 27 and an outlet 29 permits escape of condensate. An outlet 28 permits egress of filtered sulphur from the chamber above the header plate. The cover 24 is provided with a steam inlet and shut-off valve 30 so that the steam or water may be admitted at will. Shut-off valve means 31 are provided over each of the hollow tubes 20 so that all of the tubes but one may be closed at will to permit successive back-washing of the tubes individually.

Sulphur passing through the filter elements 18 finds its way into the centre of the hollow tubes 20 through openings 32 located near the lower end of each hollow tube.

In the operation of the apparatus described according to the processes of this invention, sulphur is admitted through the heated inlet 10. The sulphur rises in the casing 1 and is forced under pressure through the filter elements 18. The sulphur after filtration passes through the opening 32 up through the hollow tubes 18 and then finds its way from the upper chamber out through the pipe 28. The sulphur is maintained in a fluid condition by passing steam through the steam spaces 7 and 26.

After the filtering operation has been conducted for a considerable time the filter cake builds up on the sides of the cylindrical filter elements 18 to so great an extent that filtration can no longer be conducted rapidly and efficiently. When it thus becomes necessary to remove the filter cake the sulphur in the filter chamber 1 is withdrawn and steam is admitted through the pipe 15. The steam holds the filter cake in place while the sulphur is being withdrawn and forces any sulphur in the filter elements 18 through the hollow tube 20 and out through the pipe 28.

After sulphur has been removed from the filter the valve 15 is closed and a fluid is admitted through pipe 30 to create a back-flow through the filter elements. The filter elements are closed by means of the shut-off valves 31 so that fluid is back-washed through only one of the filter elements at a time. The back-washing can be effected by the use of steam or by the use of water together with added steam if needed. If steam is used in back-washing then water will need to be added by opening the valve on the pipe 16. A sufficient amount of water should be added either in the course of back-washing or by opening the valve 16 to make a granular slurry of the filter cake which is blown off the filter elements. The slurry is easily handled and it can be allowed to flow out through the pipe 4 at the bottom of the filter and it can subsequently be handled without difficulty since the granular form is retained even after the filter cake cools.

While I have shown a specific illustrative apparatus and process, it will be understood that various equivalent means may be substituted for those shown and various modifications may be made in the apparatus and process without departing from the spirit of this invention.

I claim:

1. In a process for the filtration of molten sulphur, the steps comprising applying sulphur under pressure to a filter element, after a filter cake is built up applying a gas under pressure to the filter to hold the cake in position and simultaneously withdrawing the molten sulphur, after the sulphur is withdrawn applying a back fluid pressure to the filter element to remove the filter cake, slurrying the filter cake with water to make it readily handleable, and supplying sufficient heat to the sulphur prior to the aforesaid step of applying the sulphur under pressure to a filter element to make the sulphur molten and supplying sufficient heat to maintain the sulphur at a temperature above its melting point at least until the filter cake has been removed from the filter element.

2. In an apparatus of the character described a cylindrical receptacle terminating at its lower end in a conical portion, a heating jacket for said cylinder, tubular filter elements supported within said cylindrical receptacle by a hollow tube, a collection receptacle into which filtered sulphur is led by said tube, means for admitting molten sulphur to the said cylindrical receptacle, means for introducing steam and water into the said cylindrical receptacle said last mentioned means comprising a vertical tube extending parallel to the axis of the said receptacle and being open at both its upper and lower extremities and being provided intermediate its said extremities with steam and water connections, means provided at the lower end of the heretofore mentioned conical portion of said cylindrical receptacle for withdrawal of sulphur and filter cake, and means provided on the aforementioned collection receptacle to supply a fluid thereto so that a back pressure may be applied to the heretofore mentioned filter elements.

3. In a process for the filtration of sulphur, the steps comprising filtering sulphur thru a filter element, after a filter cake is built up back-washing the filter element with a fluid comprising water the water being present in sufficient amount to cause the filter cake to form a granular slurry, withdrawing the granular slurry from the filter, and supplying sufficient heat to the sulphur prior to the said filtering step to make the sulphur molten and supplying sufficient heat to maintain the sulphur at a temperature above its melting point at least until the filter cake has been removed from the filter element.

4. In a process for the filtration of molten sulphur, the steps comprising dislodging a filter cake from a filter element and slurrying the filter cake with water to form a readily handleable, granular slurry, and supplying sufficient heat to the sulphur to maintain it at a temperature above its melting point at all times at least until the filter cake has been removed from the filter element.

ERNEST J. TAUCH.